(12) United States Patent
Bhamri et al.

(10) Patent No.: US 12,568,479 B2
(45) Date of Patent: Mar. 3, 2026

(54) ASSOCIATING TRANSMIT BEAMS AND SENSING BEAMS

(71) Applicant: Lenovo (Singapore) Pte. Ltd., New Tech Park (SG)

(72) Inventors: Ankit Bhamri, Rödermark (DE); Alexander Johann Maria Golitschek Edler von Elbwart, Darmstadt (DE); Karthikeyan Ganesan, Kronberg im Taunus (DE); Ali Ramadan Ali, Kraiburg am Inn (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 239 days.

(21) Appl. No.: 18/261,186

(22) PCT Filed: Jan. 12, 2022

(86) PCT No.: PCT/IB2022/050218

§ 371 (c)(1),
(2) Date: Jul. 12, 2023

(87) PCT Pub. No.: WO2022/153193

PCT Pub. Date: Jul. 21, 2022

(65) Prior Publication Data

US 2024/0073949 A1     Feb. 29, 2024

Related U.S. Application Data

(60) Provisional application No. 63/136,582, filed on Jan. 12, 2021.

(51) Int. Cl.
*H04B 7/06* (2006.01)
*H04W 8/24* (2009.01)
(Continued)

(52) U.S. Cl.
CPC ...... *H04W 72/046* (2013.01); *H04B 7/06952* (2023.05); *H04B 7/06968* (2023.05);
(Continued)

(58) Field of Classification Search
CPC ... H04B 7/02–12; H04L 5/0001–0098; H04W 8/22–245; H04W 48/02–20;
(Continued)

(56) References Cited

U.S. PATENT DOCUMENTS

2020/0275485 A1     8/2020   Babaei et al.
2023/0072340 A1 *   3/2023   El Hamss ......... H04W 74/0808

FOREIGN PATENT DOCUMENTS

WO     WO-2019210185 A1 * 10/2019   .......... H04W 72/046

OTHER PUBLICATIONS

PCT/IB2022/050218, "Notification of Transmittal of the International Search Report and the Written Opinion of the International Searching Authority, or the Declaration", International Searching Authority, Jun. 3, 2022, pp. 1-17.
(Continued)

*Primary Examiner* — Timothy J Weidner
(74) *Attorney, Agent, or Firm* — Kunzler Needham & Hilton

(57) ABSTRACT

Apparatuses, methods, and systems are disclosed for associating transmit beams and sensing beams for channel access. One apparatus (700) includes a transceiver (725) and a processor (705) that receives (905) a mapping configuration from a RAN, said the mapping configuration associating at least one transmit beam to at least one sensing beam. The processor (705) receives (910) an indication of a transmit beam to perform uplink transmission and determines (915) a sensing beam based on the indicated transmit beam and the mapping configuration. Via the transceiver (725), the processor (705) performs (920) an LBT procedure
(Continued)

prior to transmission using the determined sensing beam, where the determined sensing beam has a beamwidth that covers the indicated transmit beam, and performs (925) uplink transmission during a COT using at least the indicated transmit beam in response to LBT success.

19 Claims, 10 Drawing Sheets

(51) Int. Cl.

| | | |
|---|---|---|
| *H04W 72/044* | (2023.01) | |
| *H04W 72/23* | (2023.01) | |
| *H04W 74/00* | (2009.01) | |
| *H04W 74/0816* | (2024.01) | |
| *H04W 84/02* | (2009.01) | |
| *H04W 88/02* | (2009.01) | |
| *H04W 88/08* | (2009.01) | |
| *H04W 92/02* | (2009.01) | |
| *H04W 92/10* | (2009.01) | |

(52) U.S. Cl.
CPC ............. *H04W 8/24* (2013.01); *H04W 8/245* (2013.01); *H04W 72/23* (2023.01); *H04W 74/006* (2013.01); *H04W 74/0816* (2013.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ......... H04W 72/02–569; H04W 74/002–0891; H04W 76/10–50; H04W 84/02–16; H04W 88/02–12; H04W 92/02–04; H04W 92/10
See application file for complete search history.

(56) References Cited

OTHER PUBLICATIONS

Lenovo et al., "Channel access mechanisms for NR from 52.6 GHz to 71GHz", 3GPP TSG RAN WG1 #104-e R1-2100062, Jan. 25-Feb. 5, 2021, pp. 1-16.
ETSI, "Multiple-Gigabit/s radio equipment operating in the 60 GHz band; Harmonised Standard covering the essential requirements of article 3.2 of Directive 2014/53/EU", ETSI EN 302 567 V2.1.1, Jul. 2017, pp. 1-40.

* cited by examiner

Indicated UL Tx Beam

210

UE
205

Sensing Beam2 (SB2)
225

Sensing Beam1 (SB1)
220

Beam Coverage of
Indicated UL Tx Beam
215

Sensing Beam 3 (SB3)
230

UE
205

Beam Coverage of
Indicated UL Tx Beam
215

SB1 220
(LBT Fail)

SB3 230
(LBT Success)

SB2 225
(LBT Success)

UE
205

Beamwidth and
Directivity of Indicated
UL Tx Beam
215

Beamwidth and
Directivity of Modified
UL Tx Beam
305

UE
205

1st UL Tx Beam
(TxB1) 505

2nd UL Tx Beam
(TxB2) 510

3rd UL Tx Beam
(TxB3) 515

UE
205

Beam Coverage of
Indicated UL Tx Beam2

Wide Sensing Beam
(SB1) 520

Beam Coverage of
Indicated UL Tx Beam1

Beam Coverage of
Indicated UL Tx Beam3

UE
205

ASSOCIATING TRANSMIT BEAMS AND SENSING BEAMS

CROSS-REFERENCE TO RELATED APPLICATIONS

This application claims priority to U.S. Provisional Patent Application No. 63/136,582 entitled "ASSOCIATING LBT SENSING BEAMS AND TX/RX BEAMS FOR CHANNEL ACCESS DURING INITIAL ACCESS" and filed on Jan. 5, 2021 for Ankit Bhamri, Alexander Golitschek, Ali Ramadan Ali, and Karthikeyan Ganesan, which application is incorporated herein by reference.

FIELD

The subject matter disclosed herein relates generally to wireless communications and more particularly relates to associating at least one Listen-Before-Talk ("LBT") sensing beam with one or more transmit/receive beams for channel access.

BACKGROUND

In certain wireless communication systems, service is supplemented by operation on unlicensed spectrum. However, operation on unlicensed spectrum requires Clear Channel Assessment ("CCA") prior to transmission, for example involving a LBT procedure.

BRIEF SUMMARY

Disclosed are procedures for associating transmit beams and sensing beams for channel access. Said procedures may be implemented by apparatus, systems, methods, or computer program products.

One method of a User Equipment ("UE") device for associating transmit beams and sensing beams for channel access includes receiving a mapping configuration from a Radio Access Network ("RAN"), where the mapping configuration associates at least one transmit beam to at least one sensing beam for channel access procedure. The method includes receiving an indication of a transmit beam to perform uplink transmission and determining a sensing beam based on the indicated transmit beam and the mapping configuration between the indicated transmit beam to at least one associated sensing beam. The method includes performing a Listen-Before-Talk ("LBT") procedure (e.g., a Clear Channel Assessment) prior to transmission using the determined one or multiple sensing beams, where the determined one or multiple sensing beams have beamwidth that covers the indicated transmit beam, and performing uplink transmission during a Channel Occupancy Time ("COT") using at least the indicated transmit beam in response to LBT success.

Another method of a UE for COT sharing includes receiving a downlink transmission from the RAN during a RAN-initiated COT using a first set of receive beams and receiving a configuration for uplink transmission within the RAN-initiated COT. The second method includes determining a gap between the end of the downlink transmission and the start of a responding uplink transmission based on the received configuration and determining whether to perform an LBT procedure before the uplink transmission in the RAN-initiated COT based on the determined gap.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
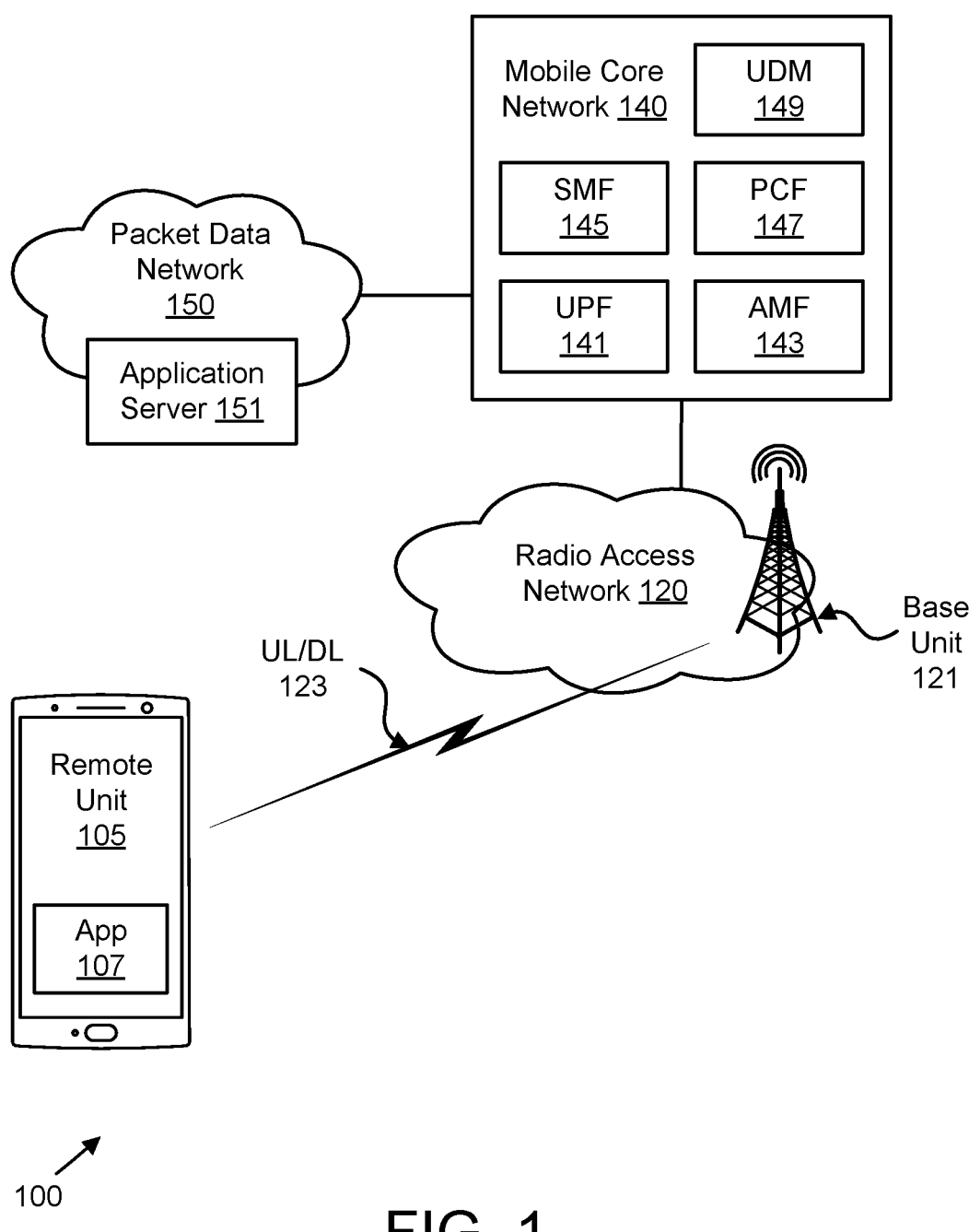
FIG. 1 is a block diagram illustrating one embodiment of a wireless communication system for associating transmit beams and sensing beams for channel access.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The call-flow diagrams, flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the call-flow, flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for mapping between transmit beams, receive beams, and/or sensing beams. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

The present disclosure deals with the channel access mechanism in unlicensed band for high frequency range—namely, Frequency Range 2 ("FR2", e.g., including includes frequency bands from 24.25 GHz to 52.6 GHz) and beyond. More specifically, as beam-based operation is assumed for unlicensed spectrum in FR2 and operating frequencies above 52.6 GHz, then for regions where LBT is mandated, directional LBT may be performed in specific beam direction(s) rather than omni-directional LBT. Alternative, omni-directional LBT—i.e., where the sensing is done in all directions—may be performed for unlicensed spectrum in FR2 and operating frequencies above 52.6 GHz.

In Third Generation Partnership Project ("3GPP") New Radio ("NR") operation on unlicensed spectrum (referred to as "NR-U"), channel access in both downlink and uplink relies on the LBT; however, no beamforming is considered for LBT in NR-U in 3GPP Release 16 ("Rel-16") and only omni-directional LBT is assumed. A MAC layer entity of the UE relies on reception of a notification of UL LBT failure from the Physical layer to detect a consistent UL LBT failure. The NR-U LBT procedures for channel access can be summarized as follows:

A) Both gNB-initiated and UE-initiated Channel Occupant Times ("COTs") use Category 4 ("Cat-4") LBT where the start of a new transmission burst always perform LBT with exponential back-off. Only with exception, when the DRS must be at most one ms in duration and is not multiplexed with unicast PDSCH.

As used herein, a Cat-4 LBT procedure refers to LBT with a random back-off and with a variable size contention window.

B) UL transmission within a gNB initiated Channel Occupancy Time ("COT") or a subsequent DL transmission within a UE or gNB initiated COT can transmit immediately without sensing only if the gap from the end of the previous transmission is not more than 16 µs, otherwise Category 2 ("Cat-2") LBT must be used, and the gap cannot exceed 25 µs. As used herein, a Cat-2 LBT procedure refers to LBT without random back-off.

LBT is used because the gNB and/or UE must first sense the channel to find out there is no on-going communications prior to any transmission. When a communication channel is a wide bandwidth unlicensed carrier, the CCA procedure relies on detecting the energy level on multiple sub-bands of the communications channel.

Disclosed herein are techniques and mechanisms to resolve the following issues for facilitation channel access in unlicensed bands where beam-based transmission/reception is expected. Various solutions disclosed herein describe how to enable association between one or multiple transmit beam(s) and one or multiple sensing beam(s) to allow for faster channel access with more opportunity for LBT success. Various solutions disclosed herein describe how to allow the possibility to support both omni-directional and directional LBT including switching between the two options. Various solutions disclosed herein describe how to handle COT sharing for DL and UL beam-based transmissions.

Disclosed are procedures for associating LBT sensing beams and TX/RX beams for channel access. New signaling is described herein to indicate/configure explicit mapping between the transmit beam for UL and the sensing beam for LBT. Different possibilities are facilitated for sensing including the flexibility to use wider and/or narrower sensing beams in comparison to transmit beams. Omni-directional and/or directional LBT is facilitated based on the mapping. Additionally, beam mapping and LBT-type selection for beam-based UL transmission in a gNB-initiated COT is disclosed.

FIG. 1 depicts a wireless communication system 100 for associating transmit beams and sensing beams for channel access, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the Fifth-Generation ("5G") cellular system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle onboard computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Furthermore, the UL communication signals may comprise one or more uplink channels, such as the Physical Uplink Control Channel ("PUCCH") and/or Physical Uplink Shared Channel ("PUSCH"), while the DL communication signals may comprise one or more downlink channels, such as the Physical Downlink Control Channel ("PDCCH") and/or Physical Downlink Shared Channel ("PDSCH"). Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR operation on unlicensed spectrum (referred to as "NR-U"), the base unit 121 and the remote unit 105 communicate over unlicensed (i.e., shared) radio spectrum.

In one embodiment, the mobile core network 140 is a 5G Core network ("5GC") or an Evolved Packet Core ("EPC"), which may be coupled to a packet data network 150, like the Internet and private data networks, among other data networks. A remote unit 105 may have a subscription or other account with the mobile core network 140. In various embodiments, each mobile core network 140 belongs to a single mobile network operator ("MNO") and/or Public Land Mobile Network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Policy Control Function ("PCF") 147, a Unified Data Management function ("UDM") and a User Data Repository ("UDR"). In some embodiments, the UDM is co-located with the UDR, depicted as combined entity "UDM/UDR" 149. Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network ("DN"), in the 5G architecture. The AMF 143 is responsible for termination of Non-Access Spectrum ("NAS") signaling, NAS ciphering & integrity protection, registration management, connection management, mobility management, access authentication and authorization, security context management. The SMF 145 is responsible for session management (i.e., session establishment, modification, release), remote unit (i.e., UE) Internet Protocol ("IP") address allocation & management, DL data notification, and traffic steering configuration of the UPF 141 for proper traffic routing.

The PCF 147 is responsible for unified policy framework, providing policy rules to CP functions, access subscription information for policy decisions in UDR. The UDM is responsible for generation of Authentication and Key Agreement ("AKA") credentials, user identification handling, access authorization, subscription management. The UDR is a repository of subscriber information and may be used to service a number of network functions. For example, the UDR may store subscription data, policy-related data, subscriber-related data that is permitted to be exposed to third party applications, and the like.

In various embodiments, the mobile core network 140 may also include a Network Repository Function ("NRF") (which provides Network Function ("NF") service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), an Authentication Server Function ("AUSF"), or other NFs defined for the 5GC. When present, the AUSF may act as an authentication server and/or authentication proxy, thereby allowing the AMF 143 to authenticate a remote unit 105. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. For example, one or more network slices may be optimized for enhanced mobile broadband ("eMBB") service. As another example, one or more network slices may be optimized for ultra-reliable low-latency communication ("URLLC") service. In other examples, a network slice may be optimized for machine-type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

While FIG. 1 depicts components of a 5G RAN and a 5G core network, the described embodiments for associating transmit beams and sensing beams for channel access apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In the following descriptions, the term "gNB" is used for the base station/base unit, but it is replaceable by any other radio access node, e.g., RAN node, ng-eNB, eNB, Base Station ("BS"), Access Point ("AP"), etc. Additionally, the term "UE" is used for the mobile station/remote unit, but it is replaceable by any other remote device, e.g., remote unit, MS, ME, etc. Further, the operations are described mainly in the context of 5G NR. However, the below described solutions/methods are also equally applicable to other mobile communication systems for associating transmit beams and sensing beams for channel access.

To resolve the above described issues, solutions are described that related to mapping/association between transmit beam(s) and sensing beam(s) for LBT:

According to embodiments of a first implementation, different mapping options between an indicated set of (i.e., one or more) transmit beam(s) for UL transmission and a corresponding set of (i.e., one or more) sensing beam(s) are facilitated for performing LBT at the UE before a UL transmission burst. To support explicit association between the sets of beam, the following signaling and configuration may be performed:

As a first step, the network (i.e., gNB and/or AMF) may semi-statically configure a UE with various Transmission Configuration Indicator ("TCI") states (including Quasi-Co-Location ("QCL") Type D assumption for beam indication)

for UL transmission. Such configuration may be via Downlink Control Information ("DCI") or via higher-layer signaling, such as Radio Resource Control ("RRC") and/or Medium Access Control ("MAC") Control Element ("CE") signaling. If no explicit TCI states are configured for UL transmission, then the TCI states for DL can be assumed to be utilized for UL transmission in case when UE is capable of beam correspondence.

As a second step, based on the configured TCI states, the network configures UE with a mapping table, where a first set of combinations of the configured TCI states for UL transmission (from step 1, above) are mapped to a second set of combinations of the TCI states (corresponding to sensing beams) to be used for Listen-Before-Talk and/or Clear Channel Assessment ("LBT/CCA").

As a third step, the UE receives signaling (e.g., MAC CE) activating a subset of the configured TCI states to be useful for LBT/CCA for UL transmission.

As a fourth step, the UE receives a TCI state indication for UL transmission. For example, for a dynamic grant, network sends DCI to UE for UL assignment including TCI state indication for indicating one or multiple beams for UL transmission. In another example, for a configured grant, the network may indicate the TCI state for UL beam(s) associated with a CG resource configuration in RRC.

As a fifth step, before initiating UL transmission, the UE determines the indicated configured TCI state(s) (alternatively, configured TCI state(s)) corresponding to the UL beams. However, before starting with transmission on indicated/configured beams, the UE determines whether to perform LBT/CCA. If LBT/CCA is required, then the UE uses the mapping table (configured above) to determine one or more corresponding sensing beam(s) for performing LBT/CCA.

In one embodiment if multiple beams are mapped for LBT/CCA, then the UE performs LBT/CCA on each of the beams in TDM manner in a sequence as indicated in the mapping table. In another embodiment, if multiple beams are mapped for LBT/CCA, then the UE performs LBT/CCA in a parallel manner on all the beams indicated in the mapping table. In other embodiments, the UE may perform LBT/CCA for the multiple beams in a combination of both parallel and TDM manners.

At a sixth step, if the outcome of LBT/CCA is successful for at least one of the beams for which LBT is performed, then the UE can start uplink transmission.

According to a second implementation, a mapping is described between the indicated Rx beam(s) at the UE for receiving DL transmission(s) in a gNB initiated COT and the corresponding Tx beam(s) for LBT at UE and UL transmission within the COT sharing.

different mapping options between an indicated set of (i.e., one or more) receive beam(s) for DL transmission(s) in a gNB-initiated COT and a corresponding set of (i.e., one or more) transmit beam(s) are facilitated for performing COT sharing, i.e., UL transmission within the gNB-initiated COT. To support explicit association between sets of beams for COT sharing, the following signaling and/or configuration may be performed:

As a first step, the network (i.e., gNB and/or AMF) may semi-statically configure a UE with various TCI states (including QCL Type D assumption for beam indication) for DL reception. Such configuration may be via DCI or via higher-layer signaling, such as RRC and/or MAC CE signaling.

As a second step, based on the configured TCI states, network configures UE with a mapping table where first set of combinations of the configured TCI states for DL transmission (from step above) are mapped to a second set of combinations of the TCI states (beams) that are allowed for UL transmission within the same COT.

As a third step, the gNB to initiates a COT and—after LBT/CCA success on one or multiple beams—the gNB transmits DL channel/signal to the UE. The UE receives corresponding DL channel/signal within the gNB-initiated COT on one or multiple Rx beams.

As a fourth step, following the DL reception at the UE within the gNB-initiated COT, the UE is also configured with configured grant resources and corresponding TCI state(s) (Tx beams for UL transmission) or is indicated a dynamic grant.

As a fifth step, before initiating UL transmission within the gNB-initiated COT, the UE maps the Rx beam(s) where the DL was received and looks up in the mapping table to determine corresponding Tx beams suitable for UL transmission within the same COT.

As a sixth step, the UE compares the suitable Tx beams determined from the mapping table with the Tx beams associated with the scheduled/configured UL transmission and depending upon that performs either short- or long-LBT and corresponding transmission upon successful LBT on at least one of the beams.

Beneficially, the above described mappings provide flexible association between transmit beam(s) and sensing beam(s) that allows the possibility to have multiple opportunities for LBT, use potentially wider and/or narrower beams for sensing in comparison to the transmit beam. Beneficially, the omni-directional LBT can also be configured in the mapping table.

Beneficially, no additional signaling required in the DCI for determining sensing beams. Beneficially, the above described mappings provide a mechanism to facilitate COT sharing with Cat-2 LBT for switching from beam-based DL transmission to beam-based UL transmission.

According to embodiments of the first solution, a UE may be configured with a mapping of one transmit beam to multiple sensing beams. In some embodiments, the UE is configured with a mapping table, where a first set of Tx beams is mapped to a second set of sensing beams. Here, a single (wide) Tx beam is mapped to multiple (narrow) sensing beams, where the beamwidth and directivity of the wider Tx beam covers the set of (narrower) sensing beams.

Figure 2A:
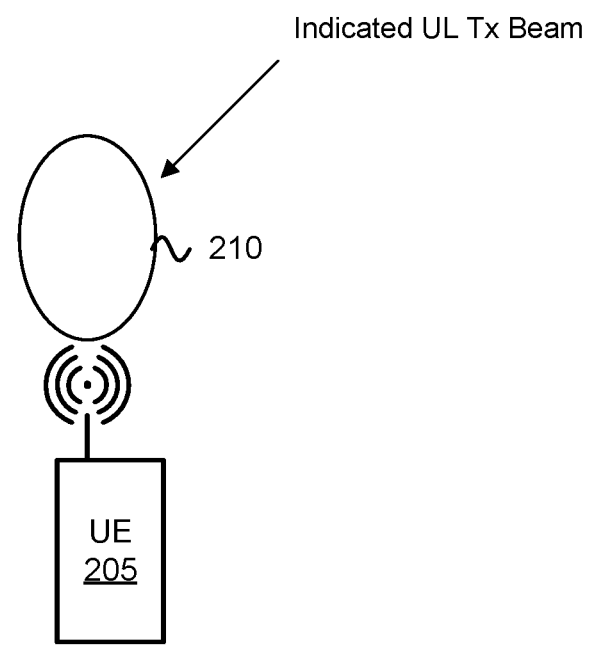
FIG. 2A is a diagram illustrating one embodiment of a wider beamwidth transmit beam indicated for an uplink transmission.
Figure 2B:
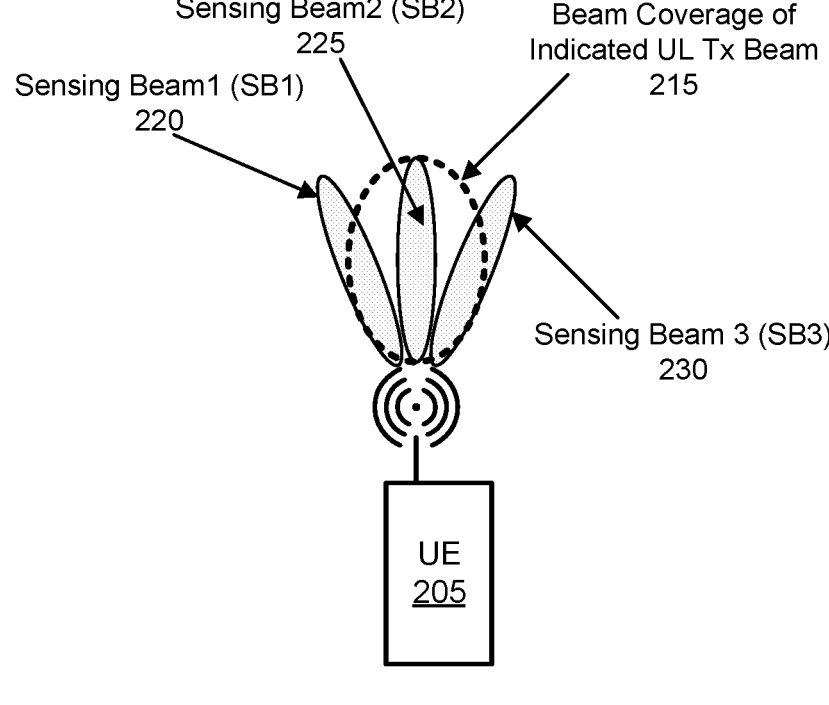
FIG. 2B is a diagram illustrating one embodiment of one wider transmit beam mapped to multiple narrower sensing beams.

FIGS. 2A-2B depict an example of one wider transmit beam mapped to multiple sensing beams, according to embodiments of the first solution. FIG. 2A depicts a UE 205 that receives, i.e., from a gNB (not depicted), an indication of a Tx Beam 210 to use for UL transmission. FIG. 2B depicts a mapping of multiple sensing beams to the indicated transmit beam. As depicted, the beam coverage (i.e., including beamwidth and beam directivity) 215 of the indicated UL Tx beam is wider that the individual sensing beams. In the depicted embodiment, the indicated UL Tx Beam 210 is mapped to at least a first sensing beam (denoted "SB1") 220, a second sensing beam (denoted "SB2") 225, and a third sensing beam (denoted "SB3") 230.

In various embodiments, the UE is indicated with one transmit beam for UL transmission. In one embodiment, the transmit beam is indicated via the TCI codepoint in the DCI for a dynamic grant. In another embodiment, the transmit beam is indicated in the RRC configuration, e.g., via the configured grant resource configuration.

As used herein, a "dynamic" grant (also referred to as "dynamic scheduling") refers to a one-time grant of time/frequency resources, e.g., to a UE. For uplink, a dynamic grant may be communicated to the UE using DCI or by Random-Access Response ("RAR") message. In contrast, a "configured" grant (also referred to as "configured scheduling" or "semi-persistent scheduling") is a semi-static configuration where a set of recurring time/frequency resources is granted to the UE. In one embodiment, a configured grant is configured to the UE using RRC signaling. In another embodiment, a configured grant ("CG") may be configured to the UE via DCI. Note that a previously configured CG may be activated via DCI.

Based on the indicated TCI state (i.e., corresponding to a Tx beam), the UE determines a set of sensing beams (for example three sensing beams including SB1, SB2, SB3) by looking up in the mapping table between transmit beams and sensing beams. Table 1 depicts an example of a '1-to-many' mapping between transmit beams and sensing beams for LBT.

TABLE 1

| TCI state of Transmit Beam (indicated/configured to UE for UL) | TCI state(s) of Sensing Beam(s) for LBT |
|---|---|
| TCI State 1 (Tx Beam) | TCI State 6 (Sensing Beam 1), TCI State 2 (Sensing Beam 2), TCI State 3 (Sensing Beam 3) |
| TCI State 2 (Tx Beam) | TCI State 2 (Sensing Beam 1), TCI State 6 (Sensing Beam 2), TCI State 3 (Sensing Beam 3) |
| . . . | . . . |

In one implementation of the first solution, the first sensing beam ("SB") is same as the indicated/configured transmit beam ("TxB") and the second and third sensing beams are narrower beams in comparison to the transmit beam. For the multiple mapped sensing beams, the UE performs LBT on the first sensing beam (e.g., same beam coverage same as the TxB) and if LBT fails, then the UE performs LBT on the second sensing beam, and so on. If LBT is successful, then the UE stops further LBT procedures and starts UL transmission.

In another implementation of the first solution, priority is associated with each of the sensing beam by the order of sensing beams in the table and the UE selects the sensing beam for performing LBT based on highest priority. If LBT fails for a higher priority sensing beam, then the UE 205 selects the next highest priority beam as the sensing beam for performing LBT. If LBT is successful, then the UE stops further LBT procedures and starts UL transmission.

In a further implementation, the UE performs sensing operations using each of the mapped sensing beam with a time-division multiplexing ("TDM") manner, or in parallel manner, or in a combination of TDM and parallel sensing. The combination of TDM and parallel sensing is particularly applicable when the UE is capable of parallel sensing of a certain number of beams that is smaller than the number of sensing beams configured for a Tx beam.

In another implementation, if LBT sensing succeeds for more than one of the sensing beams, the UE selects the transmission beam according to the priority of the corresponding sensing beam within the set of sensing beams. For example, taking the configuration of Table 1, if LBT sensing succeeds for Sensing Beam 1 and Sensing Beam 3, then UE determines to transmit the indicated transmit beam based on Sensing Beam 1 due to higher priority.

In another implementation, a UE can be configured whether the priority of the sensing beams as given by the order in mapping table is to be applied, or whether it is up to the device to choose a priority. For example, the UE may assign a priority to the beam where the most recent LBT sensing was successful.

In some embodiments, if the LBT is successful on one of the sensing beams, it performs the UL transmission on the transmit beam indicated via the TCI codepoint. Therefore, the sensing beam with LBT success and the transmit beam used for transmission may or may not be same (i.e., either partially overlap or completely overlap). In other embodiments, if the LBT is successful on one beam, then the transmit beam is adjusted to transmit using the same beam on which LBT is successful (assumption being that gNB is able to receive the adjusted beam as well without any explicit indication by the UE). Therefore, the UE may or may not use the transmit beam indicated via TCI codepoint.

In some embodiments, if the LBT is successful on a beam and if there are still some remaining sensing beams, UE continue with LBT on the remaining sensing beams. After the LBT is performed on all the sensing beams that are mapped to the transmit beam, UE can adjust the transmit beam according to the sensing beams on which LBT is successful.

Figure 3A:
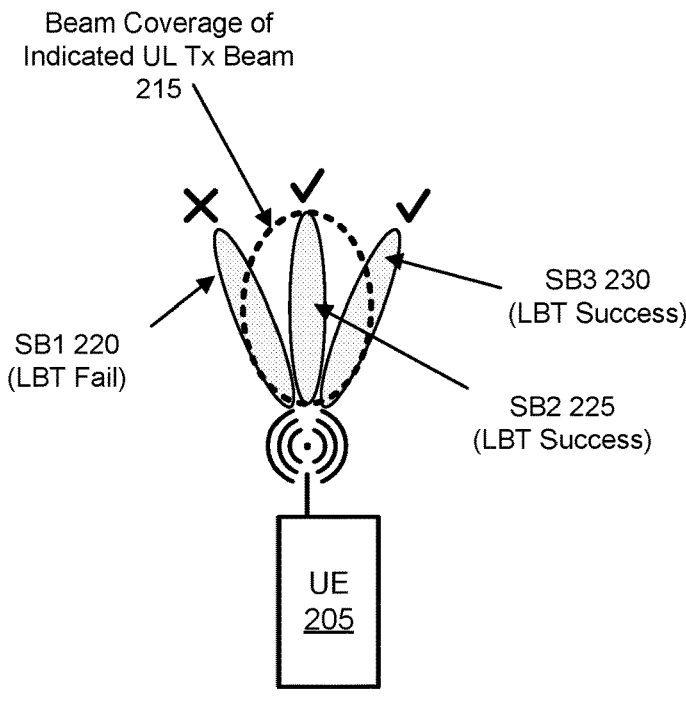
FIG. 3A is a diagram illustrating one embodiment of performing LBT on multiple sensing beams.
Figure 3B:
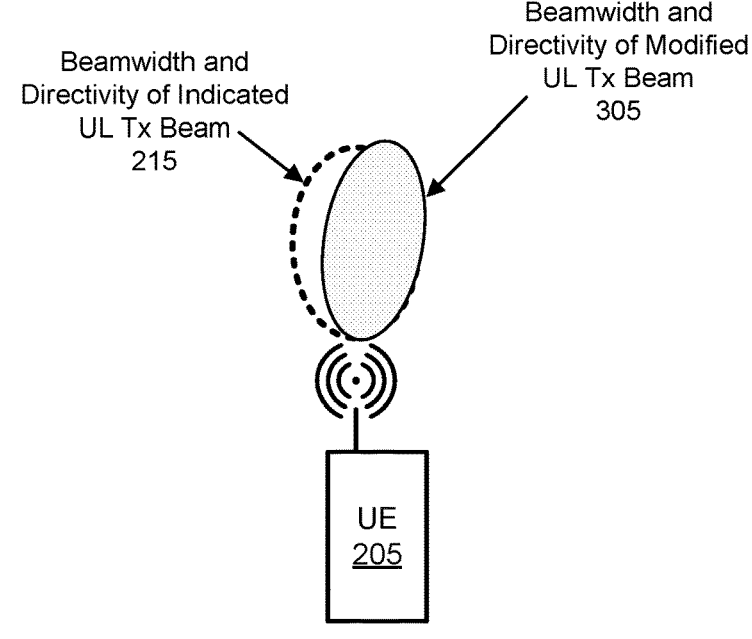
FIG. 3B is a diagram illustrating one embodiment of adjusted transmit ("Tx") beamwidth corresponding to sensing beams with LBT success.

FIGS. 3A-3B depict an example of adjusted Tx beamwidth corresponding to sensing beams with LBT success, according to the first embodiment. Here, it is assumed that the UE receives an indication of a (wider) UL Tx beam and maps the indicated UL Tx beam to multiple sensing beams, as discussed above with reference to FIGS. 2A-2B. The UE 205 then performs LBT/CCA procedure using the determined sensing beams.

FIG. 3A depicts the UE 205 having performed a LBT procedure for at least the first sensing beam (denoted "SB1") 220, the second sensing beam (denoted "SB2") 225, and a third sensing beam (denoted ("SB3") 230. Here, it is assumed that LBT failure was experienced for SB1 220, while LBT success was achieved for SB2 225 and SB3 230.

FIG. 3B depicts the UE 205 performing UL transmission using an adjusted transmit beam 305, according to embodiments of the disclosure. After the LBT is done, the UE 205 adjusts the transmit beam for UL such that a single Tx beam is used that covers the beamwidth of SB2 225 and SB3 230 (assumption being that the gNB is able to receive the adjusted beam as well without any explicit indication by the UE).

Figure 4:
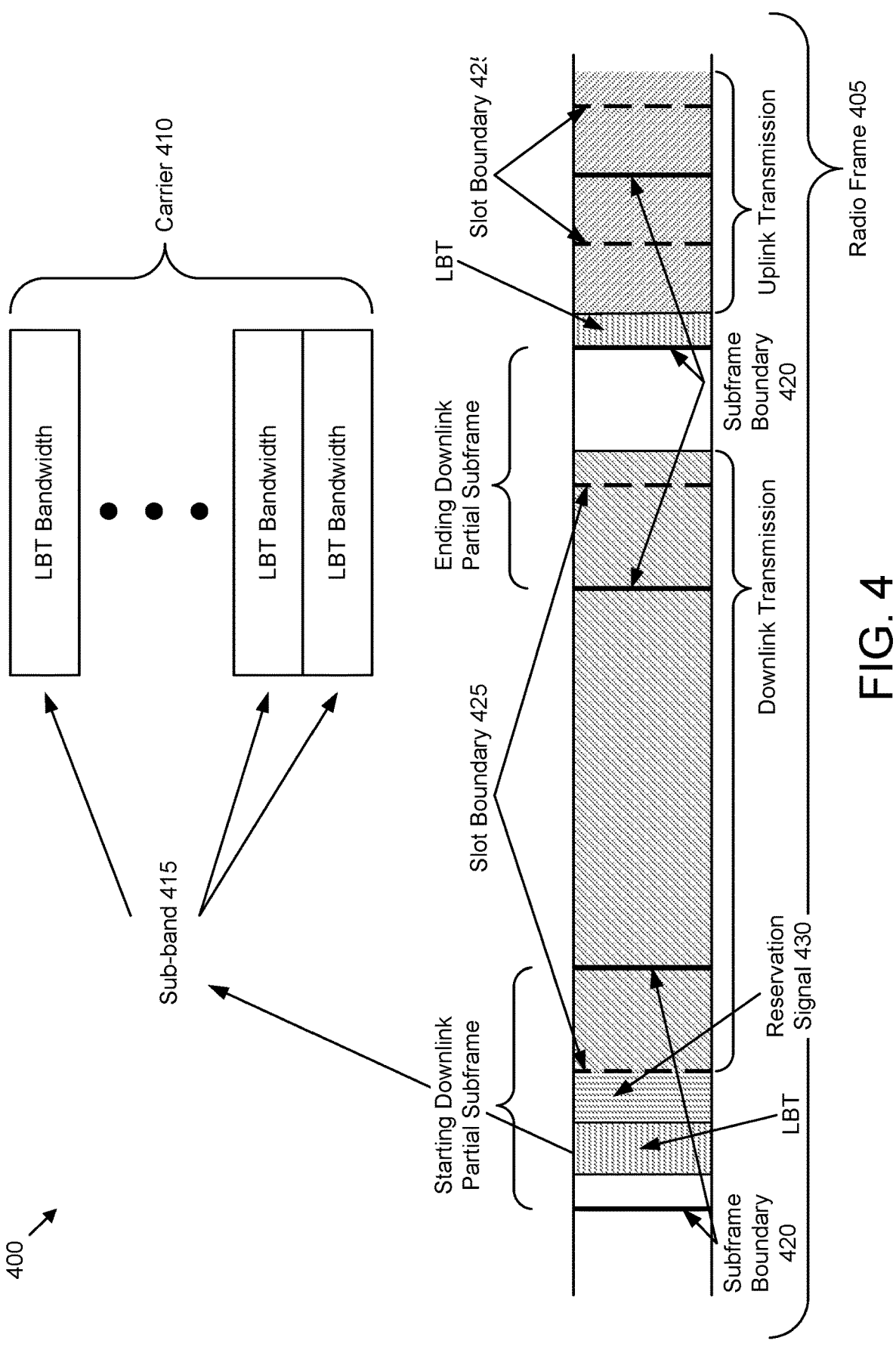
FIG. 4 is a diagram illustrating one embodiment of a radio frame during which LBT procedure is performed.

FIG. 4 depicts an LBT procedure 400 for a radio frame 405 for unlicensed communication, according to embodiments of the disclosure. When a communication channel is a wide bandwidth unlicensed carrier 410 (e.g., several hundred MHz, the CCA/LBT procedure relies on detecting the energy level on multiple sub-bands 415 of the communications channel as shown in FIG. 4. The LBT parameters (such as type/duration, clear channel assessment parameters, etc.) are configured in the UE 205 by a RAN node, such as the gNB. In one embodiment, the LBT procedure is performed at the physical layer. When performing omni-directional LBT, the entity (i.e., gNB or UE 205) may use an omnidirectional sensing beam. Alternatively, the entity may simultaneously perform directional LBT using multiple beams (i.e., corresponding to multiple device panels) in order to simulate omnidirectional sensing. When performing directional LBT, the entity (i.e., gNB or UE 205) performs LBT for a given beam (i.e., corresponding to a given spatial direction). Note that each directional beam may correspond to one or more device panels.

FIG. 4 also depicts frame structure of the radio frame 405 for unlicensed communication between the UE 205 and gNB. The radio frame 405 may be divided into subframes (indicated by subframe boundaries 420) and may be further divided into slots (indicated by slot boundaries 425). The radio frame 405 uses a flexible arrangements where uplink and downlink operations are on the same frequency channel but are separated in time. However, the subframes are not configured as a downlink subframe or an uplink subframe and a particular subframe may be used by either the UE 205 or gNB. As discussed previously, LBT is performed prior to a transmission. Where LBT does not coincide with a slot boundary 425, a reservation signal 430 may be transmitted to reserve (i.e., occupy) the channel until the slot boundary is reached and data transmission begins.

According to embodiments of a second solution, a UE may be configured with a mapping of multiple, narrower transmit beams to a wider sensing beam. In some embodiments, the UE is configured with a mapping table, where a first set of Tx beams is mapped to a second set of sensing beams. Here, the first set of Tx beams contains multiple Tx beams, while the second set of beams contains a sensing beam whose beamwidth and directivity cover the first set of Tx beams.

Additionally, the UE may be indicated with multiple transmit beams for multiple UL transmissions/repetitions. In one embodiment, the multiple transmits beams are indicated to the UE via the TCI codepoint in the DCI for dynamic grant. In another embodiment, the multiple transmits beams are indicated to the UE in the RRC configuration via the configured grant resource configuration. In a first embodiment of the second solution, the UE determines a single sensing beam based on the indicated TCI states, for example by looking up in the mapping table between transmit beams and sensing beams. Table 2 depicts an example of a 'many-to-1' mapping between transmit beams and sensing beams for LBT.

TABLE 2

| TCI state of Transmit Beam (indicated/configured to UE for UL) | TCI state(s) of Sensing Beam(s) for LBT |
|---|---|
| TCI State 1 (TxB1), TCI State 2 (TxB2), TCI State 3 (TxB3), . . . | TCI State 4 (SB1) . . . |

As an example, the UE may be indicated with the TCI states corresponding to transmit beams: TxB1, TxB2, TxB3. In this example, the UE would determine from the configured mapping Table 2 that a single sensing beam (i.e., SB1 corresponding to TCI state 4) is to be used for LBT prior to UL transmission on the indicated transmit beams (i.e., TxB1, TxB2, TxB3).

In some embodiments, the UE can be configured with multiple Tx beams and multiple UL transmissions on the beams. Multiple UL transmissions can be done either in TDM manner or simultaneously at the same time using SDM. Correspondingly, a single wider beam can be used for sensing that covers all the transmission beams before the start of transmissions in the beginning of COT.

Figure 5A:
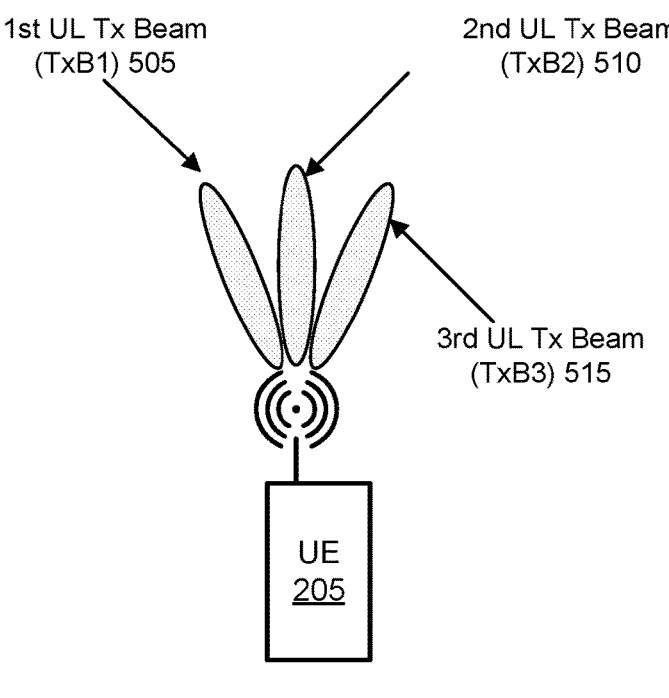
FIG. 5A is a diagram illustrating one embodiment of multiple transmit beams identified for uplink transmissions.
Figure 5B:
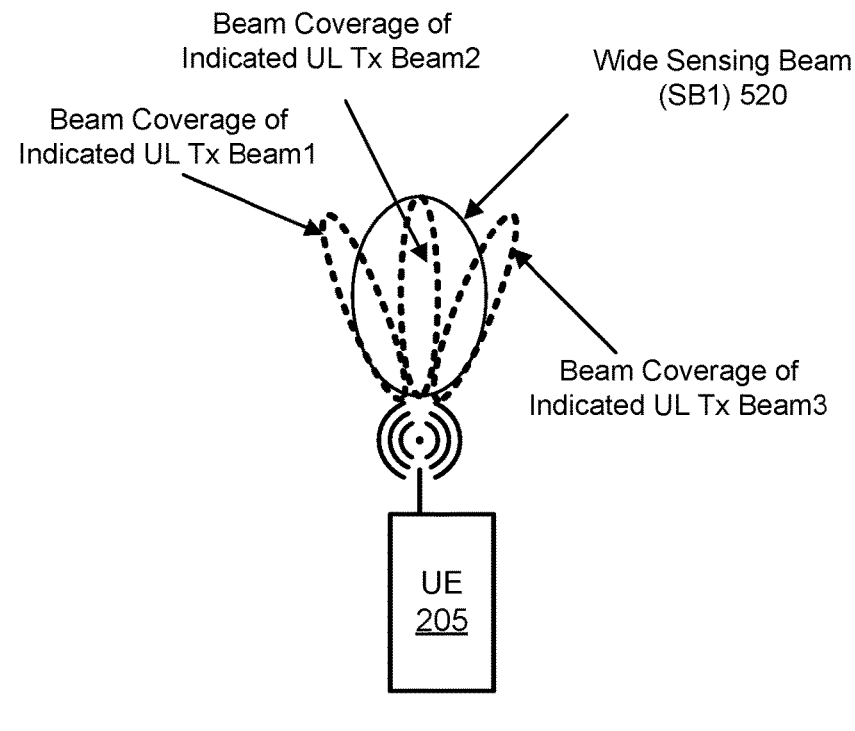
FIG. 5B is a diagram illustrating one embodiment of multiple transmit beams mapped to one wider sensing beam.

FIGS. 5A-5B depict one example of multiple transmit beams mapped to one wider sensing beam, according to embodiments of the second solution. FIG. 5A depicts a UE 205 that receives, i.e., from a gNB (not depicted), and indication of multiple Tx beams to use for UL transmission. Here, the UE 205 receives an indication for a first Tx Beam (denoted "TxB1") 505, a second Tx Beam (denoted "TxB2") 510, and a third Tx Beam (denoted "TxB3"). FIG. 5B depicts a mapping of a wide sensing beam (denoted "SB1")

520 to the indicated Tx Beams. In one implementation, the sensing beam (SB1) 520 is a wider beam that is encompassing multiple transmit beams (TxB1, TxB2, TxB3). As shown in FIG. 5B, the beam coverage (i.e., including beamwidth and beam directivity) of the wide sensing beam 520 covers the beam coverages of the multiple indicated Tx beams. The UE 205 performs LBT on the SB1 and if LBT fails, no UL transmission is performed.

In an alternate embodiment of the second solution, the UE 205 determines a set of sensing beams based on the indicated TCI states, where the set of sensing beams contains one wide sensing beam (e.g., that covers the indicated Tx beams) and at least one narrower sensing beam that corresponds with an indicted Tx beam (for example: SB1, SB2, SB3, SB4) by looking up in the mapping table between transmit beams and sensing beams. Table 3 depicts an example of a 'many-to-many' mapping between transmit beams and sensing beams for LBT.

TABLE 3

| TCI state of Transmit Beam (indicated/configured to UE for UL) | TCI state(s) of Sensing Beam(s) for LBT |
|---|---|
| TCI State 1 (TxB1), TCI State 2 (TxB2), TCI State 3 (TxB3), . . . | TCI State 4 (SB1), TCI State 1 (SB2), TCI State 2 (SB3), TCI State 3 (SB4) . . . |

As an example, the UE may be indicated with the TCI states corresponding to transmit beams: TxB1, TxB2, TxB3. In this example, the UE would determine from the configured mapping Table 3 that a wide sensing beam (i.e., SB1 corresponding to TCI state 4) and a set of multiple narrow sensing beams (i.e., SB2, SB3 and SB4, corresponding to TCI States 1, 2, and 3, respectively) correspond to the indicated transmit beams (i.e., TxB1, TxB2, TxB3).

In one implementation of the alternate embodiment, one or more sensing beam(s) (e.g., SB1) is a wider beam that is encompassing multiple transmit beams (TxB1, TxB2, TxB3) and SB2, SB3 and SB4 are corresponding to indicated TxB1, TxB2, TxB3. The UE first performs LBT on SB1. If successfully, the UE transmits on all of the multiple indicated transmit beams.

However, if LBT fails for SB1, then the UE performs LBT on SB2, and so on. Accordingly, UL transmissions are performed only one beams where the LBT is successful. For example, if LBT fails on SB1 and SB2, but is successful on SB3 and SB4, then only the transmissions associated with SB3 and SB4 are performed. In an alternate implementation, if the transmission occasion for one indicated beam cannot be used for transmission due to LBT failure, then one of the other beams associated with one of the other transmissions for whose beam the LBT is successful is used for that transmission occasion (i.e., assuming that the gap for using the same beam from previous transmission is below a certain threshold).

In some embodiments, the UE can be configured with multiple Tx beams and multiple UL transmissions on the Tx beams. Multiple UL transmissions can be done either in TDM manner or simultaneously at the same time using SDM. Correspondingly, a single wider beam and/or multiple narrower sensing beams associated with each of the TX beams can be used for sensing that covers all the transmission beams before the start of transmissions in the beginning of COT and/or sensing within the COT before the start of each transmission when transmissions are done in TDM manner.

Figure 6:
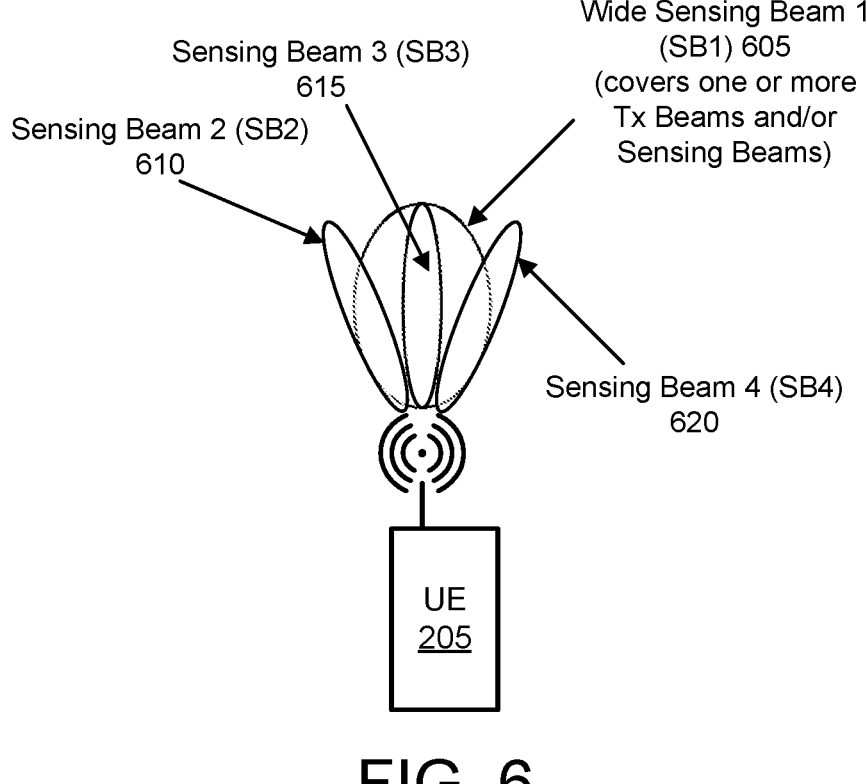
FIG. 6 is a diagram illustrating one embodiment of multiple transmit beams mapped to one wider sensing beam and multiple narrower sensing beams.

FIG. 6 depicts one example of multiple transmit beams mapped to one wider sensing beam and multiple narrower beams, according to the second embodiment. Here, it is assumed that the UE 205 is indicated with the transmit beams depicted in FIG. 5A and discussed above. In the embodiment of FIG. 6, the UE 205 maps the indicated Tx beams to a set of four sensing beam, e.g., as represented in Table 3.

As depicted, the first sensing beam (denoted "SB1") 605 is a wide sensing beam that covers the combined beamwidth of the indicated Tx beams. In one embodiment, the first sensing beam 605 correspond to the first sensing beam 520, described above.

The second sensing beam (denoted "SB2") 610 is a narrower sensing beam that corresponds to the beamwidth and beam directivity of the first UL Tx beam 505. The third sensing beam (denoted "SB3") 615 is a narrower sensing beam that corresponds to the beamwidth and beam directivity of the second UL Tx beam 510. The fourth sensing beam (denoted "SB4") 620 is a narrower sensing beam that corresponds to the beamwidth and beam directivity of the third UL Tx beam 515.

According to embodiments of a third solution, a UE may be configured with multiple options for a mapping a set of transmit ("Tx") beams to sensing beams. In some embodiments, the UE is configured with a mapping table containing multiple options for a same set of Tx beams. In certain embodiments, the mapping table may contain a column with index values, where an index value is used to indicate which option should be used for the set of Tx beams.

In various embodiments, the UE is indicated with one transmit beam or multiple transmit beams for multiple UL transmissions/repetitions, e.g., via the TCI codepoint in the DCI for dynamic grant, or in the RRC configuration via the configured grant resource configuration. Based on the indicated TCI states (for example TxB1, TxB2, TxB3), the UE determines a type of LBT to perform (i.e., an omni-directional LBT, a directional LBT, both omni-direction and directional LBT, or no LBT). In some embodiments, if the mapping table indicates that LBT is to is be performed, then the mapping table also indicates which sensing beams are to be used for the corresponding LBT procedure(s).

Table 4 depicts an exemplary mapping table with multiple LBT options. Table 4 may optionally include a column with index values used to differentiate different rows having the same TCI state of Transmit Beams. In an alternative embodiment, the entries of the column "TCI state of Transmit Beams" are unique entries and so the column of index values is omitted as unneeded to differentiate different rows having the same TCI state of Transmit Beams.

TABLE 4

| TCI state of Transmit Beam (indicated/configured to UE for UL) | Index (Optional) | TCI state(s) of Sensing Beam(s) for LBT |
| --- | --- | --- |
| TCI State 1 (TxB1), TCI State 2 (TxB2), TCI State 3 (TxB3), | 1 | Omni-directional LBT |
| TCI State 1 (TxB1), TCI State 2 (TxB2), TCI State 3 (TxB3), | 2 | Omni-directional LBT, TCI State 1 (SB1), TCI State 2 (SB2), TCI State 3 (SB3) |
| TCI State 1 (TxB1), TCI State 2 (TxB2), TCI State 3 (TxB3), | 3 | No-LBT |
| . . . | . . . | . . . |

In a first implementation, the UE determines that only omni-directional LBT is associated with these indicated transmit beams, as illustrated in the first mapping row of Table 4.

In a second implementation, the UE determines that first omni-directional LBT is associated with the indicated transmit beams, then followed by sensing beams SB1, SB2 and SB3, as illustrated in the second mapping row of Table 4.

In a third implementation, the UE determines that no LBT is associated with the indicated transmit beams, as illustrated in the third mapping row of Table 4.

In other embodiments, if the indicated transmit beams are not available in the mapping table (i.e., no association configured between the indicated transmit beams and any sensing beams), then it is up to UE implementation what LBT mechanism is applied including omni-directional LBT, directional LBT, a combination thereof, or no-LBT.

According to embodiments of a fourth solution, a UE determines a type of LBT (if any) to be performed when sharing a COT initiated by a gNB. In some embodiments, the UE receives a configuration for uplink transmission within the RAN-initiated COT and determines a gap between the end of the downlink transmission and the start of a responding uplink transmission based on the received (uplink) configuration. Additionally, the UE may be configured with at least one gap threshold.

In some embodiments, the determined gap is less than a configured gap threshold value. In such embodiments, the UE may determine that the responding UL transmission may occur without performing an LBT procedure in the gNB-initiated COT. In some embodiments, the determined gap is greater than or equal to the configured gap threshold value. In such embodiments, the UE may perform an LBT procedure prior to the responding uplink transmission. In certain embodiments, the LBT procedure performed when the gap is greater than or equal to the configured threshold value comprises a shortened LBT (i.e., Cat-2 LBT).

In one implementation of the fourth solution, the UE is allowed to perform Cat-2 LBT (i.e., short LBT) to access channel for UL transmission after the DL transmission based on two conditions: A) If the gap between the end of DL transmission and the start of UL transmission is below a fixed threshold value configured to the UE, for example 16 us; and B) if at least one of the beams indicated/configured to UE for the dynamic or configured grant resources is determined to be suitable based on the aforementioned mapping.

In an alternate example, if the gap between the UL/DL transmission(s) and previous DL/UL transmission(s) on the channel is more than a threshold that is determined by the gNB and is at least 8 μs, the UL/DL transmission(s) occurs following Cat-2 LBT by sensing in a sensing slot with a duration is equal to 5 μs where the channel is sensed to be idle.

In another implementation of the fourth solution, if any or both of the above conditions are not met, then the UE may be prohibited from transmitting in the gNB-initiated COT using Cat-2 LBT. However, the UE would be allowed to do Cat-4 LBT (in both cases), which implies that it is starting a new COT and (by definition) is sharing the gNB-initiated COT.

Additionally, the UE may determine a suitable set of Tx beam(s) for UL transmission within the gNB-initiated COT, according to embodiments of the fourth solution. In various embodiments, the UE is configured with a mapping table, where a first set of receive ("Rx") beams is mapped to a second set of transmit ("Tx") beams. Here, the first set of Rx beams may correspond to beams used by the UE to receive the one or more downlink ("DL") transmissions within the gNB-initiated COT, while the second set of Tx beams may correspond to Tx beams to be used by the UE to transmit UL transmissions within the same gNB-initiated COT.

According to embodiments of a fifth solution, a UE may be configured with a mapping among receive ("Rx") beams used for reception on downlink ("DL") channels during a same Channel Occupancy Time ("COT"). In some embodiments, the UE is configured with a mapping table, where a first set of Rx beams is mapped to a second set of Rx beams. Here, the first set of Rx beams (e.g., identified by TCI state with QCL assumption type D) may correspond to beams used by the UE to receive a Physical Downlink Control Channel ("PDCCH") Control Resource Set ("CORESET"), while the second set of Rx beams may correspond to beams used by the UE to monitor and/or receive other DL channels within the same COT initiated by PDCCH CORESET beams.

Figure 7:
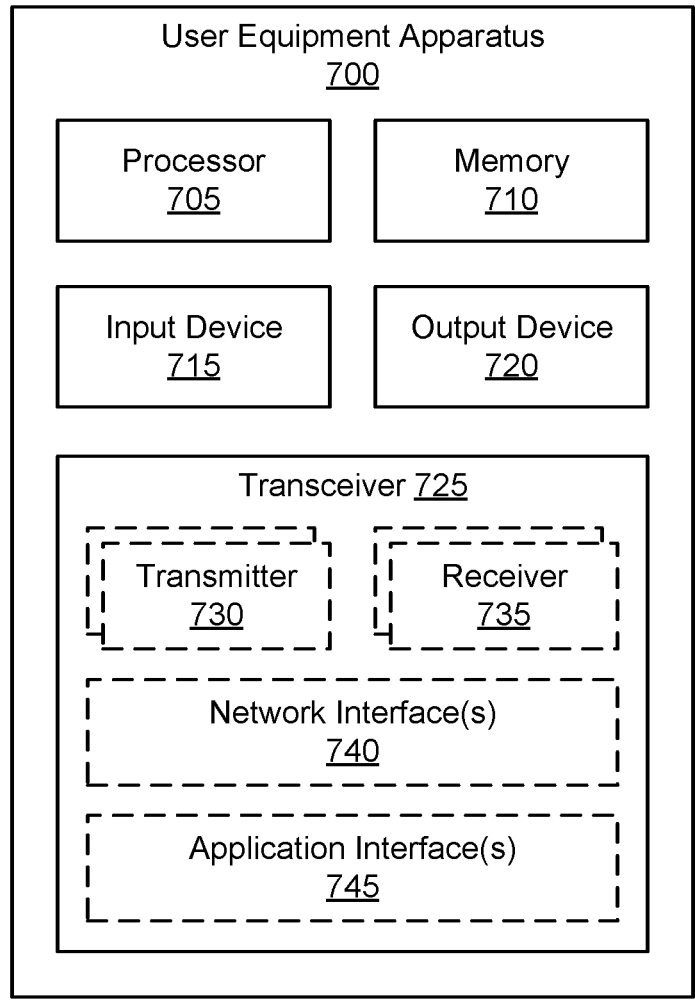
FIG. 7 is a block diagram illustrating one embodiment of a user equipment apparatus that may be used for associating transmit beams and sensing beams for channel access.

FIG. 7 depicts a user equipment apparatus 700 that may be used for associating transmit beams and sensing beams for channel access, according to embodiments of the disclosure. In various embodiments, the user equipment apparatus 700 is used to implement one or more of the solutions described above. The user equipment apparatus 700 may be one embodiment of the remote unit 105, the UE 205, and/or the user equipment apparatus 700, described above. Furthermore, the user equipment apparatus 700 may include a processor 705, a memory 710, an input device 715, an output device 720, and a transceiver 725.

In some embodiments, the input device 715 and the output device 720 are combined into a single device, such as a touchscreen. In certain embodiments, the user equipment apparatus 700 may not include any input device 715 and/or output device 720. In various embodiments, the user equipment apparatus 700 may include one or more of: the processor 705, the memory 710, and the transceiver 725, and may not include the input device 715 and/or the output device 720.

As depicted, the transceiver 725 includes at least one transmitter 730 and at least one receiver 735. In some embodiments, the transceiver 725 communicates with one or more cells (or wireless coverage areas) supported by one or more base units 121. In various embodiments, the transceiver 725 is operable on unlicensed spectrum. Moreover, the transceiver 725 may include multiple UE panels supporting one or more beams. Additionally, the transceiver 725 may support at least one network interface 740 and/or application interface(s) 745. The application interface(s) 745 may support one or more APIs. The network interface(s) 740 may support 3GPP reference points, such as Uu, N1, PC5, etc. Other network interfaces 740 may be supported, as understood by one of ordinary skill in the art.

The processor 705, in one embodiment, may include any known controller capable of executing computer-readable instructions and/or capable of performing logical operations. For example, the processor 705 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725.

In various embodiments, the processor 705 controls the user equipment apparatus 700 to implement the above described UE behaviors. In certain embodiments, the processor 705 may include an application processor (also known as "main processor") which manages application-domain and operating system ("OS") functions and a base-band processor (also known as "baseband radio processor") which manages radio functions.

In various embodiments, the processor 705 receives a mapping configuration from a RAN, said the mapping configuration associating at least one transmits beam to at least one sensing beam. The processor 705 receives an indication of a transmit beam (i.e., at least one Tx beam) to perform uplink transmission and determines a sensing beam (i.e., at least one sensing beam) based on the indicated transmit beam and the mapping configuration between the indicated beam and at least one associated sensing beam. Via the transceiver 725, the processor 705 performs an LBT procedure prior to transmission using the determined sensing beam, where the determined sensing beam has a beamwidth that covers the indicated transmit beam, and performs uplink transmission during a COT using at least the indicated transmit beam in response to LBT success.

In some embodiments, the processor 705 determines a spatial domain filter for the sensing beam based on a QCL assumption type-D of the indicated transmit beam when the UE indicates a capability for beam correspondence without the UL beam sweeping, and when the selected sensing beam has a same beamwidth and a same directivity as the transmission beam. In other embodiments, a spatial domain filter for the sensing beam covers all transmit beams when the UE does not indicate the capability for beam correspondence without the UL beam sweeping.

In certain embodiments, the mapping configuration associates multiple transmit beams to a single (wide) sensing beam (i.e., a many-to-one mapping of transmit beams to sensing beams). In certain embodiments, the mapping configuration associates each transmit beam to one sensing beam (i.e., a one-to-one mapping of transmit beams to sensing beams).

In certain embodiments, the mapping configuration associates each transmit beam to one sensing beam and associates multiple transmit beams to a single (wide) sensing beam (i.e., both a one-to-one mapping and a many-to-one mapping of transmit beams to sensing beams). In certain embodiments, the mapping configuration associates one transmit beam to multiple (narrower) sensing beams. (i.e., a one-to-many mapping of transmit beams to sensing beams).

In some embodiments, the received indication of a transmit beam to perform uplink transmission indicates a first group of transmit beams. In such embodiments, determining the sensing beam based on the indicated transmit beams includes determining a first (i.e., wide) sensing beam having a beamwidth that covers each beam of the first group of transmit beams and also determining a group of second (i.e., narrow) sensing beams based on the first group of transmit beams and the mapping configuration, each beam of the group of second sensing beams corresponding to a transmit beam from the first group of transmit beams.

In certain embodiments, the processor 705 performs one or more LBT procedures using the group of second sensing beams in response to LBT failure for the first sensing beam. In such embodiments, performing uplink transmission during the COT using at least the indicated transmit beam includes performing uplink transmission only on transmit beams where LBT is successful for the corresponding second sensing beam.

In some embodiments, the processor 705 receives the indication of first group of transmit beams from the RAN by receiving a TCI codepoint in DCI (i.e., for dynamic grant). In some embodiments, the processor 705 receives the indication of first group of transmit beams from the RAN by receiving a TCI codepoint in an RRC configuration (e.g., via CG resource configuration).

In some embodiments, the uplink transmission is a responding transmission made during a COT initiated by the RAN (e.g., gNB). In such embodiments, performing the LBT procedure occurs in response to a gap between the end of a downlink transmission and the start of the uplink transmission is greater than or equal to a configured threshold value.

In various embodiments, the transceiver 725 receives a downlink transmission from the RAN during a RAN-initiated COT using a first set of receive beams and the processor 705 receives a configuration for uplink transmission within the RAN-initiated COT. The processor 705 determines a gap between the end of the downlink transmission and the start of a responding uplink transmission based on the received (uplink) configuration and determines whether to perform an LBT procedure before the uplink transmission in the RAN-initiated COT based on the determined gap.

In some embodiments, the processor 705 performs the responding uplink transmission in the RAN-initiated COT. In some embodiments, the processor 705 receives a mapping configuration from a RAN, where the mapping configuration associates the set of receive beams to a set of transmit beams. In such embodiments, the processor 705 determines a first set of transmit beams based on the first set of receive beams and the mapping configuration, where the uplink transmission in the RAN-initiated COT is performed using the first set of transmit beams.

In some embodiments, the processor 705 does not perform an LBT procedure prior to the responding uplink transmission in response to the gap between the end of a downlink transmission and the start of the uplink transmission being less than the configured threshold value. In other embodiments, the processor 705 performs an LBT procedure prior to the responding uplink transmission in response to the gap between the end of a downlink transmission and the start of the uplink transmission being greater than or equal to the configured threshold value. In certain embodiments, the LBT procedure performed when the gap is greater than or equal to the configured threshold value comprises a shortened LBT (i.e., Cat-2 LBT).

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data related to associating transmit beams and sensing beams for channel access and/or mobile operation. For example, the memory 710 may store various parameters, panel/beam configurations, resource assignments, policies, and the like as described above. In certain embodiments, the memory 710 also stores program code and related data, such as an operating system or other controller algorithms operating on the apparatus 700.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, is designed to output visual, audible, and/or haptic signals. In some embodiments, the output device 720 includes an electronically controllable display or display device capable of outputting visual data to a user. For example, the output device 720 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 720 may include a wearable display separate from, but communicatively coupled to, the rest of the user equipment apparatus 700, such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, the output device 720 may be located near the input device 715.

The transceiver 725 communicates with one or more network functions of a mobile communication network via one or more access networks. The transceiver 725 operates under the control of the processor 705 to transmit messages, data, and other signals and also to receive messages, data, and other signals. For example, the processor 705 may selectively activate the transceiver 725 (or portions thereof) at particular times in order to send and receive messages.

The transceiver 725 includes at least transmitter 730 and at least one receiver 735. One or more transmitters 730 may be used to provide UL communication signals to a base unit 121, such as the UL transmissions described herein. Similarly, one or more receivers 735 may be used to receive DL communication signals from the base unit 121, as described herein. Although only one transmitter 730 and one receiver 735 are illustrated, the user equipment apparatus 700 may have any suitable number of transmitters 730 and receivers 735. Further, the transmitter(s) 730 and the receiver(s) 735 may be any suitable type of transmitters and receivers. In one embodiment, the transceiver 725 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/ receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 725, transmitters 730, and receivers 735 may be implemented as physically separate components that access a shared hardware resource and/or software resource, such as for example, the network interface 740.

In various embodiments, one or more transmitters 730 and/or one or more receivers 735 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 730 and/or one or more receivers 735 may be implemented and/or integrated into a multi-chip module. In some embodiments, other components such as the network interface 740 or other hardware components/circuits may be integrated with any number of transmitters 730 and/or receivers 735 into a single chip. In such embodiment, the transmitters 730 and receivers 735 may be logically configured as a transceiver 725 that uses one more common control signals or as modular transmitters 730 and receivers 735 implemented in the same hardware chip or in a multi-chip module.

Figure 8:
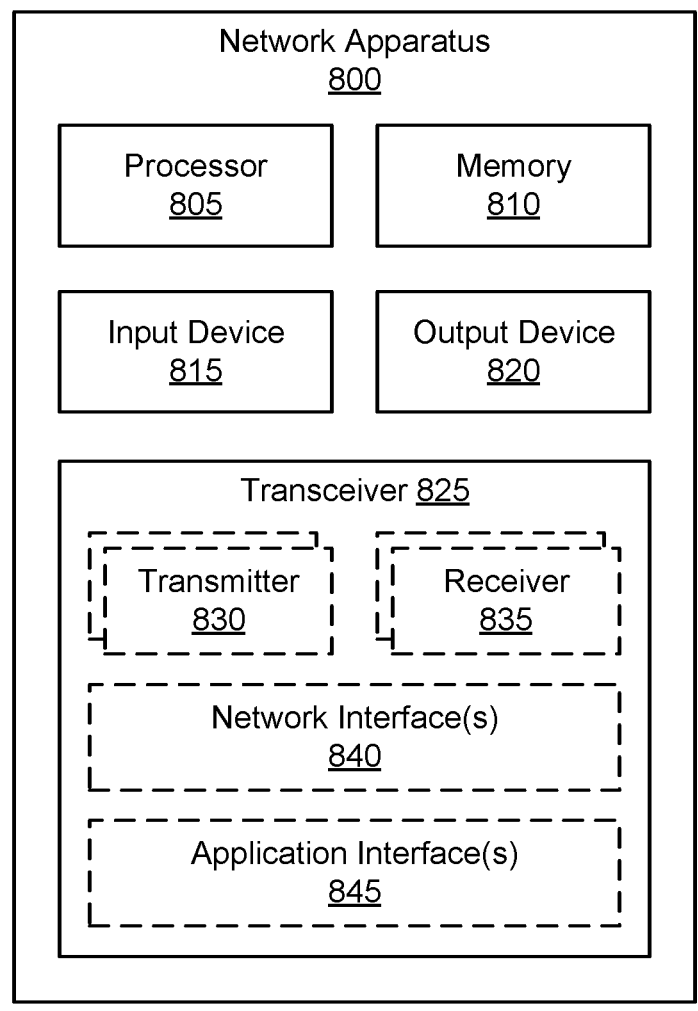
FIG. 8 is a block diagram illustrating one embodiment of a network apparatus that may be used for associating transmit beams and sensing beams for channel access.

FIG. 8 depicts a network apparatus 800 that may be used for associating transmit beams and sensing beams for channel access, according to embodiments of the disclosure. In one embodiment, network apparatus 800 may be one implementation of a RAN device, such as the base unit 121, as described above. Furthermore, the network apparatus 800 may include a processor 805, a memory 810, an input device 815, an output device 820, and a transceiver 825.

In some embodiments, the input device 815 and the output device 820 are combined into a single device, such as a touchscreen. In certain embodiments, the network apparatus 800 may not include any input device 815 and/or output device 820. In various embodiments, the network apparatus 800 may include one or more of: the processor 805, the memory 810, and the transceiver 825, and may not include the input device 815 and/or the output device 820.

As depicted, the transceiver 825 includes at least one transmitter 830 and at least one receiver 835. Here, the transceiver 825 communicates with one or more remote units 105. Additionally, the transceiver 825 may support at least one network interface 840 and/or application interface 845. The application interface(s) 845 may support one or more APIs. The network interface(s) 840 may support 3GPP reference points, such as Uu, N1, N2 and N3. Other network interfaces 840 may be supported, as understood by one of ordinary skill in the art.

The processor 805, in one embodiment, may include any known controller capable of executing computer-readable instructions and/or capable of performing logical operations. For example, the processor 805 may be a microcontroller, a microprocessor, a CPU, a GPU, an auxiliary processing unit, a FPGA, or similar programmable controller. In some embodiments, the processor 805 executes instructions stored in the memory 810 to perform the methods and routines described herein. The processor 805 is communicatively coupled to the memory 810, the input device 815, the output device 820, and the transceiver 825.

In various embodiments, the network apparatus 800 is a RAN node (e.g., gNB) that communicates with one or more UEs, as described herein. In such embodiments, the processor 805 controls the network apparatus 800 to perform the above described RAN behaviors. When operating as a RAN node, the processor 805 may include an application processor (also known as "main processor") which manages application-domain and operating system ("OS") functions and a baseband processor (also known as "baseband radio processor") which manages radio functions.

The memory 810, in one embodiment, is a computer readable storage medium. In some embodiments, the memory 810 includes volatile computer storage media. For example, the memory 810 may include a RAM, including dynamic RAM ("DRAM"), synchronous dynamic RAM ("SDRAM"), and/or static RAM ("SRAM"). In some embodiments, the memory 810 includes non-volatile computer storage media. For example, the memory 810 may include a hard disk drive, a flash memory, or any other suitable non-volatile computer storage device. In some embodiments, the memory 810 includes both volatile and non-volatile computer storage media.

In some embodiments, the memory 810 stores data related to associating transmit beams and sensing beams for channel access and/or mobile operation. For example, the memory 810 may store parameters, configurations, resource assignments, policies, and the like, as described above. In certain embodiments, the memory 810 also stores program code and related data, such as an operating system or other controller algorithms operating on the apparatus 800.

The input device 815, in one embodiment, may include any known computer input device including a touch panel, a button, a keyboard, a stylus, a microphone, or the like. In some embodiments, the input device 815 may be integrated with the output device 820, for example, as a touchscreen or similar touch-sensitive display. In some embodiments, the input device 815 includes a touchscreen such that text may be input using a virtual keyboard displayed on the touchscreen and/or by handwriting on the touchscreen. In some embodiments, the input device 815 includes two or more different devices, such as a keyboard and a touch panel.

The output device 820, in one embodiment, is designed to output visual, audible, and/or haptic signals. In some embodiments, the output device 820 includes an electronically controllable display or display device capable of outputting visual data to a user. For example, the output device 820 may include, but is not limited to, an LCD display, an LED display, an OLED display, a projector, or similar display device capable of outputting images, text, or the like to a user. As another, non-limiting, example, the output device 820 may include a wearable display separate from, but communicatively coupled to, the rest of the network apparatus 800, such as a smart watch, smart glasses, a heads-up display, or the like. Further, the output device 820 may be a component of a smart phone, a personal digital assistant, a television, a table computer, a notebook (laptop) computer, a personal computer, a vehicle dashboard, or the like.

In certain embodiments, the output device 820 includes one or more speakers for producing sound. For example, the output device 820 may produce an audible alert or notification (e.g., a beep or chime). In some embodiments, the output device 820 includes one or more haptic devices for producing vibrations, motion, or other haptic feedback. In some embodiments, all or portions of the output device 820 may be integrated with the input device 815. For example, the input device 815 and output device 820 may form a touchscreen or similar touch-sensitive display. In other embodiments, the output device 820 may be located near the input device 815.

The transceiver 825 includes at least transmitter 830 and at least one receiver 835. One or more transmitters 830 may be used to communicate with the UE, as described herein. Similarly, one or more receivers 835 may be used to communicate with network functions in the Public Land Mobile Network ("PLMN") and/or RAN, as described herein. Although only one transmitter 830 and one receiver 835 are illustrated, the network apparatus 800 may have any suitable number of transmitters 830 and receivers 835. Further, the transmitter(s) 830 and the receiver(s) 835 may be any suitable type of transmitters and receivers.

Figure 9:
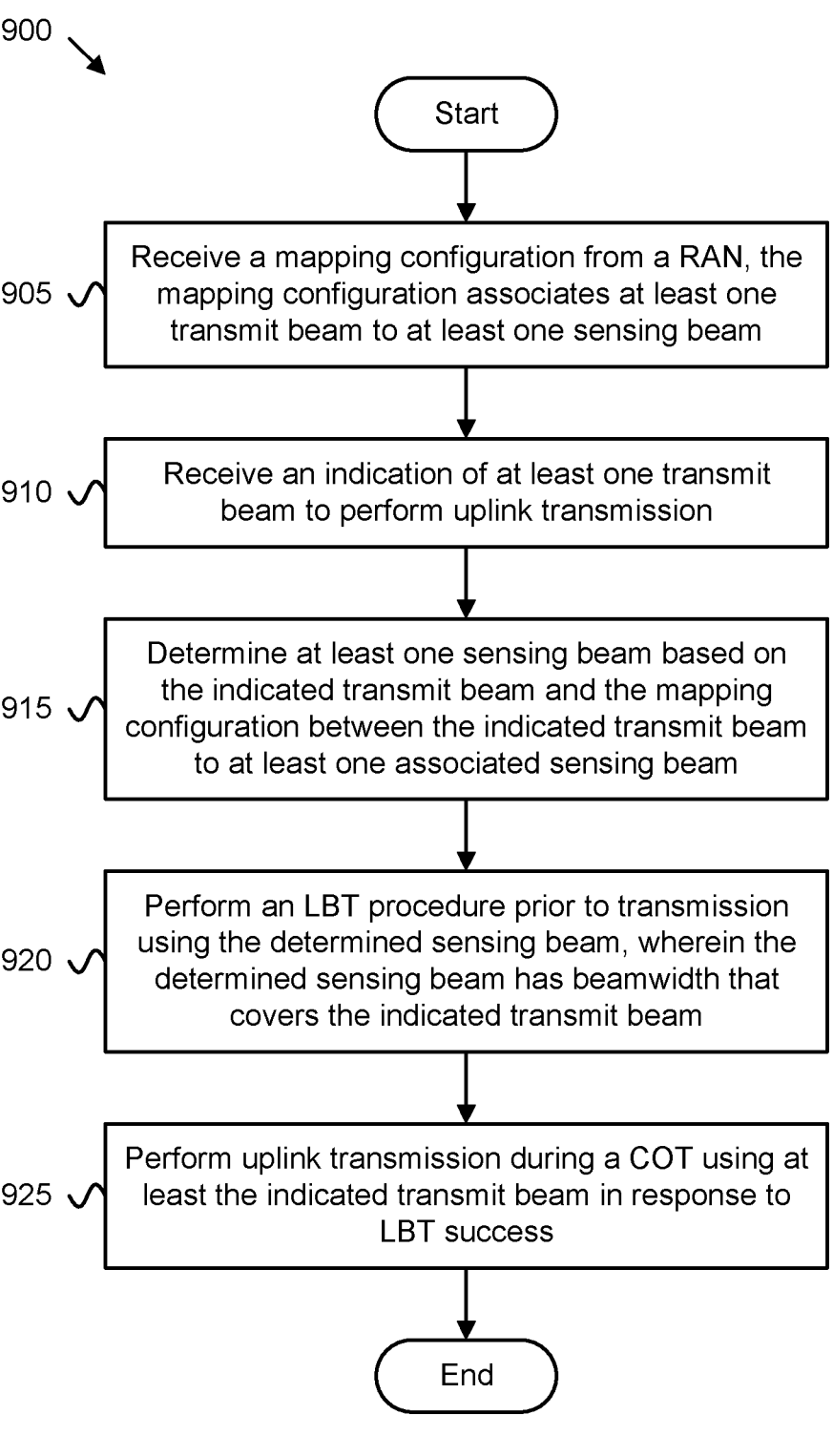
FIG. 9 is a flowchart diagram illustrating one embodiment of a first method for associating transmit beams and sensing beams for channel access.

FIG. 9 depicts one embodiment of a method 900 for associating transmit beams and sensing beams for channel access, according to embodiments of the disclosure. In various embodiments, the method 900 is performed by a UE device, such as the remote unit 95, the UE 205, and/or the user equipment apparatus 700, described above as described above. In some embodiments, the method 900 is performed by a processor, such as a microcontroller, a microprocessor, a CPU, a GPU, an auxiliary processing unit, a FPGA, or the like.

The method 900 begins and receives 905 a mapping configuration from a RAN, where the mapping configuration associates at least one transmit beam to at least one sensing beam. The method 900 includes receiving 910 an indication of a transmit beam to perform uplink transmission. The method 900 includes determining 915 a sensing beam based on the indicated transmit beam and the mapping configuration between the indicated transmit beam to at least one associated sensing beam. The method 900 includes performing 920 an LBT procedure prior to transmission using the determined sensing beam, where the determined sensing beam has beamwidth that covers the indicated transmit beam. The method 900 includes performing 925 uplink transmission during a COT using at least the indicated transmit beam in response to LBT success. The method 900 ends.

Figure 10:
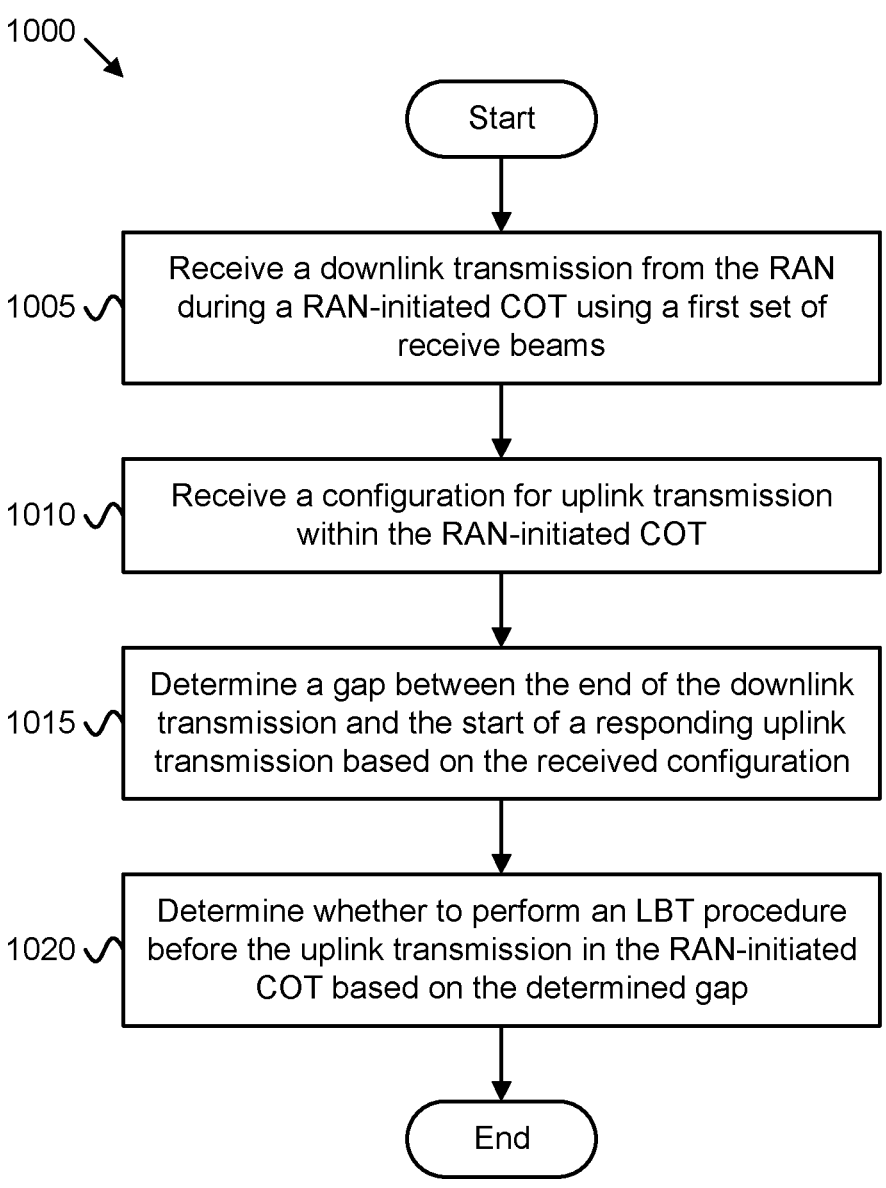
FIG. 10 is a flowchart diagram illustrating one embodiment of a second method for associating transmit beams and sensing beams for channel access.

FIG. 10 depicts one embodiment of a method 1000 for COT sharing, according to embodiments of the disclosure. In various embodiments, the method 1000 is performed by a UE device, such as the remote unit 105, the UE 205, and/or the user equipment apparatus 700, described above as described above. In some embodiments, the method 1000 is performed by a processor, such as a microcontroller, a microprocessor, a CPU, a GPU, an auxiliary processing unit, a FPGA, or the like.

The method 1000 begins and receives 1005 a downlink transmission from the RAN during a RAN-initiated COT using a first set of receive beams. The method 1000 includes receiving 1010 a configuration for uplink transmission within the RAN-initiated COT. The method 1000 includes determining 1015 a gap between the end of the downlink transmission and the start of a responding uplink transmission based on the received (uplink) configuration. The method 1000 includes determining 1020 whether to perform an LBT procedure before the uplink transmission in the RAN-initiated COT based on the determined gap. The method 1000 ends.

Disclosed herein is a first apparatus for associating transmit beams and sensing beams for channel access, according to embodiments of the disclosure. The first apparatus may be implemented by a UE device, such as the remote unit 105, the UE 205, and/or the user equipment apparatus 700, described above. The first apparatus includes a transceiver and a processor that receives a mapping configuration from a RAN, the mapping configuration associates at least one transmits beam to at least one sensing beam. The processor receives an indication of a transmit beam (i.e., at least one Tx beam) to perform uplink transmission and determines a sensing beam (i.e., at least one sensing beam) based on the indicated transmit beam and the mapping configuration between the indicated beam and at least one associated sensing beam. Via the transceiver, the processor performs an LBT procedure prior to transmission using the determined sensing beam, where the determined sensing beam has a beamwidth that covers the indicated transmit beam, and performs uplink transmission during a COT using at least the indicated transmit beam in response to LBT success.

In some embodiments, the processor determines a spatial domain filter for the sensing beam based on a QCL assumption type-D of the indicated transmit beam when the UE indicates a capability for beam correspondence without the UL beam sweeping, and when the selected sensing beam has a same beamwidth and a same directivity as the transmission beam. In other embodiments, a spatial domain filter for the sensing beam covers all transmit beams when the UE does not indicate the capability for beam correspondence without the UL beam sweeping.

In certain embodiments, the mapping configuration associates multiple transmit beams to a single (wide) sensing beam (i.e., a many-to-one mapping of transmit beams to sensing beams). In certain embodiments, the mapping configuration associates each transmit beam to one sensing beam (i.e., a one-to-one mapping of transmit beams to sensing beams).

In certain embodiments, the mapping configuration associates each transmit beam to one sensing beam and associates multiple transmit beams to a single (wide) sensing beam (i.e., both a one-to-one mapping and a many-to-one mapping of transmit beams to sensing beams). In certain embodiments, the mapping configuration associates one transmit beam to multiple (narrower) sensing beams. (i.e., a one-to-many mapping of transmit beams to sensing beams).

In some embodiments, the received indication of a transmit beam to perform uplink transmission indicates a first group of transmit beams. In such embodiments, determining the sensing beam based on the indicated transmit beams includes determining a first (i.e., wide) sensing beam having a beamwidth that covers each beam of the first group of transmit beams and also determining a group of second (i.e., narrow) sensing beams based on the first group of transmit beams and the mapping configuration, each beam of the group of second sensing beams corresponding to a transmit beam from the first group of transmit beams.

In certain embodiments, the processor performs one or more LBT procedures using the group of second sensing beams in response to LBT failure for the first sensing beam. In such embodiments, performing uplink transmission during the COT using at least the indicated transmit beam includes performing uplink transmission only on transmit beams where LBT is successful for the corresponding second sensing beam.

In some embodiments, the processor receives the indication of first group of transmit beams from the RAN by receiving a TCI codepoint in DCI (i.e., for dynamic grant). In some embodiments, the processor receives the indication of first group of transmit beams from the RAN by receiving a TCI codepoint in an RRC configuration (e.g., via CG resource configuration).

In some embodiments, the uplink transmission is a responding transmission made during a COT initiated by the RAN (e.g., gNB). In such embodiments, performing the LBT procedure occurs in response to a gap between the end of a downlink transmission and the start of the uplink transmission is greater than or equal to a configured threshold value.

Disclosed herein is a first method for associating transmit beams and sensing beams for channel access, according to embodiments of the disclosure. The first method may be performed by a UE device, such as the remote unit 105, the UE 205, and/or the user equipment apparatus 700, described above. The first method includes receiving a mapping configuration from a RAN, where the mapping configuration associates at least one transmit beam to at least one sensing beam. The first method includes receiving an indication of a transmit beam (i.e., at least one Tx beam) to perform uplink transmission and determining a sensing beam (i.e., at least one sensing beam) based on the indicated transmit beam and the mapping configuration between the indicated transmit beam to at least one associated sensing beam. The first method includes performing an LBT procedure prior to transmission using the determined sensing beam, where the determined sensing beam has beamwidth that covers the indicated transmit beam, and performing uplink transmission during a COT using at least the indicated transmit beam in response to LBT success.

In some embodiments, the first method includes determining a spatial domain filter for the sensing beam based on a QCL assumption type-D of the indicated transmit beam when the UE indicates a capability for beam correspondence without the UL beam sweeping, and when the selected sensing beam has a same beamwidth and a same directivity as the transmission beam. In other embodiments, a spatial domain filter for the sensing beam covers all transmit beams when the UE does not indicate the capability for beam correspondence without the UL beam sweeping.

In certain embodiments, the mapping configuration associates multiple transmit beams to a single (wide) sensing beam (i.e., a many-to-one mapping of transmit beams to sensing beams). In certain embodiments, the mapping configuration associates each transmit beam to one sensing beam (i.e., a one-to-one mapping of transmit beams to sensing beams).

In certain embodiments, the mapping configuration associates each transmit beam to one sensing beam and associates multiple transmit beams to a single (wide) sensing beam (i.e., both a one-to-one mapping and a many-to-one mapping of transmit beams to sensing beams). In certain embodiments, the mapping configuration associates one transmit beam to multiple (narrower) sensing beams. (i.e., a one-to-many mapping of transmit beams to sensing beams).

In some embodiments, the received indication of a transmit beam to perform uplink transmission indicates a first group of transmit beams. In such embodiments, determining the sensing beam based on the indicated transmit beams includes both determining a first (i.e., wide) sensing beam having a beamwidth that covers each beam of the first group of transmit beams and also determining a group of second (i.e., narrow) sensing beams based on the first group of transmit beams and the mapping configuration, each beam of the group of second sensing beams corresponding to a transmit beam from the first group of transmit beams. In such embodiments, the first method includes performing LBT using the group of second sensing beams in response to LBT failure for the first sensing beam. Moreover, performing uplink transmission during the COT using at least the indicated transmit beam includes performing uplink transmission only on transmit beams where LBT is successful for the corresponding second sensing beam.

In some embodiments, receiving the indication of first group of transmit beams from the RAN comprises receiving a TCI codepoint in DCI (i.e., for dynamic grant). In some embodiments, receiving the indication of first group of transmit beams from the RAN comprises receiving a TCI codepoint in an RRC configuration (i.e., via CG resource configuration). In some embodiments, the uplink transmission is a responding transmission made during a COT initiated by the RAN (e.g., gNB). In such embodiments, performing the LBT procedure occurs in response to a gap between the end of a downlink transmission and the start of the uplink transmission is greater than or equal to a configured threshold value.

Disclosed herein is a second apparatus for COT sharing, according to embodiments of the disclosure. The second apparatus may be implemented by a UE device, such as the remote unit 105, the UE 205, and/or the user equipment apparatus 700, described above. The second apparatus includes a transceiver the receives a downlink transmission from the RAN during a RAN-initiated COT using a first set of receive beams and a processor that receives a configuration for uplink transmission within the RAN-initiated COT. The processor determines a gap between the end of the downlink transmission and the start of a responding uplink transmission based on the received (uplink) configuration and determines whether to perform an LBT procedure before the uplink transmission in the RAN-initiated COT based on the determined gap.

In some embodiments, the processor performs the responding uplink transmission in the RAN-initiated COT. In some embodiments, the processor receives a mapping configuration from a RAN, where the mapping configuration associates the set of receive beams to a set of transmit beams. In such embodiments, the processor determines a first set of transmit beams based on the first set of receive beams and the mapping configuration, where the uplink transmission in the RAN-initiated COT is performed using the first set of transmit beams.

In some embodiments, the processor does not perform an LBT procedure prior to the responding uplink transmission in response to the gap between the end of a downlink transmission and the start of the uplink transmission being less than the configured threshold value. In other embodiments, the processor performs an LBT procedure prior to the responding uplink transmission in response to the gap between the end of a downlink transmission and the start of the uplink transmission being greater than or equal to the configured threshold value. In certain embodiments, the LBT procedure performed when the gap is greater than or equal to the configured threshold value comprises a shortened LBT (i.e., Cat-2 LBT).

Disclosed herein is a second method for COT sharing, according to embodiments of the disclosure. The second method may be performed by a UE device, such as the remote unit 105, the UE 205, and/or the user equipment apparatus 700, described above. The second method includes receiving a downlink transmission from the RAN during a RAN-initiated COT using a first set of receive beams and receiving a configuration for uplink transmission within the RAN-initiated COT. The second method includes determining a gap between the end of the downlink transmission and the start of a responding uplink transmission based on the received (uplink) configuration and determining whether to perform an LBT procedure before the uplink transmission in the RAN-initiated COT based on the determined gap.

In some embodiments, the second method includes performing the responding uplink transmission in the RAN-initiated COT. In some embodiments, the second method includes receiving a mapping configuration from a RAN, where the mapping configuration associates the set of receive beams to a set of transmit beams. In such embodiments, the second method includes determining a first set of transmit beams based on the first set of receive beams and the mapping configuration, where the uplink transmission in the RAN-initiated COT is performed using the first set of transmit beams.

In some embodiments, the second method comprises not performing any LBT procedure prior to the responding uplink transmission in response to the gap between the end of a downlink transmission and the start of the uplink transmission being less than the configured threshold value. In other embodiments, the second method comprises performing an LBT procedure prior to the responding uplink transmission in response to the gap between the end of a downlink transmission and the start of the uplink transmission being greater than or equal to the configured threshold value. In certain embodiments, the LBT procedure performed when the gap is greater than or equal to the configured threshold value comprises a shortened LBT (i.e., Cat-2 LBT).

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a User Equipment ("UE"), the method comprising:
receiving a mapping configuration from a Radio Access Network ("RAN"), wherein the mapping configuration associates at least one transmit beam to at least one sensing beam;
receiving an indication of a transmit beam for performing an uplink transmission;
determining a sensing beam based on the indicated transmit beam and the mapping configuration;
performing, prior to the uplink transmission, a Listen-Before-Talk ("LBT") procedure using the determined sensing beam, wherein the determined sensing beam has beamwidth that covers the indicated transmit beam; and
performing the uplink transmission during a Channel Occupancy Time ("COT") using at least the indicated transmit beam in response to LBT success.

2. The method of claim 1, further comprising:
determining a spatial domain filter for the sensing beam based on a Quasi-Co-Location ("QCL") assumption type-D of the indicated transmit beam, and
indicating a capability for beam correspondence without uplink beam sweeping, wherein the determined sensing beam has a same beamwidth and a same directivity as the indicated transmit beam.

3. The method of claim 1, wherein a spatial domain filter for the sensing beam covers all transmit beams when the UE does not indicate a capability for beam correspondence without uplink beam sweeping.

4. The method of claim 1, wherein the mapping configuration comprises one or more of:
an association of multiple transmit beams to a single sensing beam;
an association of one transmit beam to one sensing beam;
an association of multiple transmit beams to a single sensing beam; and
an association of one transmit beam to multiple sensing beams.

5. The method of claim 1, wherein the received indication indicates a first group of transmit beams, wherein determining the sensing beam based on the indicated transmit beam and the mapping configuration comprises determining a first sensing beam having a beamwidth that covers each beam of the first group of transmit beams and further determining a group of second sensing beams based on the first group of transmit beams and the mapping configuration, each beam of the group of second sensing beams corresponding to a respective transmit beam from the first group of transmit beams.

6. The method of claim 5, further comprising performing the LBT procedure using the group of second sensing beams in response to an LBT failure for the first sensing beam, wherein performing the uplink transmission during the COT using at least the indicated transmit beam comprises performing the uplink transmission only on a respective transmit beam where LBT is successful for corresponding second sensing beam.

7. The method of claim 1, wherein receiving the indication of the transmit beam comprises receiving a Transmission Configuration Indicator ("TCI") codepoint in Downlink Control Information ("DCI").

8. The method of claim 1, wherein receiving the indication of the transmit beam comprises receiving a Transmission Configuration Indicator ("TCI") codepoint in a Radio Resource Control ("RRC") configuration.

9. The method of claim 1, wherein the COT is a RAN-initiated COT, wherein the uplink transmission is a responding transmission made during the COT, and wherein performing the LBT procedure occurs in response to determining that a gap between an end of a downlink transmission and a start of the uplink transmission is greater than or equal to a configured threshold value.

10. A User Equipment ("UE") for wireless communication, comprising:
at least one memory; and
at least one processor coupled with the at least one memory and configured to cause the UE to:
receive a mapping configuration from a Radio Access Network ("RAN"), wherein the mapping configuration associates at least one transmits beam to at least one sensing beam;
receive an indication of a transmit beams for performing an uplink transmission;
determine a sensing beam based on the indicated transmit beam and the mapping configuration;
perform, prior to the uplink transmission, a Listen-Before-Talk ("LBT") procedure using the determined sensing beam, wherein the determined sensing beam has a beamwidth that covers the indicated transmit beam; and
perform the uplink transmission during a Channel Occupancy Time ("COT") using at least the indicated transmit beam in response to LBT success.

11. The UE of claim 10, wherein the at least one processor is configured to cause the UE to:

determine a spatial domain filter for the sensing beam based on a Quasi-Co-Location ("QCL") assumption type-D of the indicated transmit beam; and indicate a capability for beam correspondence without uplink beam sweeping, wherein the determined sensing beam has a same beamwidth and a same directivity as the indicated transmit beam.

12. The UE of claim 10, wherein a spatial domain filter for the sensing beam covers all transmit beams when the UE does not indicate a capability for beam correspondence without uplink beam sweeping.

13. The UE of claim 10, wherein the mapping configuration comprises one or more of:

an association of multiple transmit beams to a single sensing beam;

an association of one transmit beam to one sensing beam;

an association of multiple transmit beams to a single sensing beam; and an association of one transmit beam to multiple sensing beams.

14. The UE of claim 10, wherein the received indication indicates a first group of transmit beams, wherein to determine the sensing beam based on the indicated transmit beam and the mapping configuration, the at least one processor is configured to cause the UE to:

determine a first sensing beam having a beamwidth that covers each beam of the first group of transmit beams; and determine a group of second sensing beams based on the first group of transmit beams and the mapping configuration, wherein each beam of the group of second sensing beams corresponds to a respective transmit beam from the first group of transmit beams.

15. The UE of claim 14, wherein the at least one processor is configured to cause the UE to:

perform the LBT procedure using the group of second sensing beams in response to an LBT failure for the first sensing beam; and

perform the uplink transmission only on a respective transmit beam where LBT is successful for corresponding second sensing beam.

16. The UE of claim 10, wherein to receive the indication of the transmit beam, the at least one processor is configured to cause the UE to receive a Transmission Configuration Indicator ("TCI") codepoint in Downlink Control Information ("DCI").

17. The UE of claim 10, wherein to receive the indication of the transmit beam, the at least one processor is configured to cause the UE to receive a Transmission Configuration Indicator ("TCI") codepoint in a Radio Resource Control ("RRC") configuration.

18. The UE of claim 10, wherein the COT is a RAN-initiated COT, wherein the uplink transmission is a responding transmission made during the COT, and wherein the at least one processor is configured to cause the UE to perform the LBT procedure in response to determining that a gap between an end of a downlink transmission and a start of the uplink transmission is greater than or equal to a configured threshold value.

19. A processor for wireless communication, comprising:

at least one controller coupled with at least one memory and configured to cause the processor to:

receive a mapping configuration from a Radio Access Network ("RAN"), wherein the mapping configuration associates at least one transmits beam to at least one sensing beam;

receive an indication of a transmit beams for performing an uplink transmission;

determine a sensing beam based on the indicated transmit beam and the mapping configuration;

perform, prior to the uplink transmission, a Listen-Before-Talk ("LBT") procedure using the determined sensing beam, wherein the determined sensing beam has a beamwidth that covers the indicated transmit beam; and perform the uplink transmission during a Channel Occupancy Time ("COT") using at least the indicated transmit beam in response to LBT success.

* * * * *